(12) United States Patent
Nicora et al.

(10) Patent No.: US 11,571,962 B2
(45) Date of Patent: Feb. 7, 2023

(54) POWER TRANSMISSION UNIT FOR SHAFTS AND VEHICLE FOR CARRYING PASSENGERS AND GOODS

(71) Applicant: IVECO S.P.A., Turin (IT)

(72) Inventors: Fabio Nicora, Belo Horizonte (BR); José Francivaldo Pereira De Lemos, Sete Lagoas (BR)

(73) Assignee: IVECO S.P.A., Turin (IT)

( * ) Notice: Subject to any disclaimer, the term of this patent is extended or adjusted under 35 U.S.C. 154(b) by 450 days.

(21) Appl. No.: 16/767,578

(22) PCT Filed: Nov. 23, 2018

(86) PCT No.: PCT/BR2018/050434
§ 371 (c)(1),
(2) Date: May 27, 2020

(87) PCT Pub. No.: WO2019/100133
PCT Pub. Date: May 31, 2019

(65) Prior Publication Data
US 2021/0370756 A1    Dec. 2, 2021

(30) Foreign Application Priority Data

Nov. 27, 2017 (BR) .......................... 102017025400-3

(51) Int. Cl.
*B60K 6/48* (2007.10)
*B60K 6/365* (2007.10)
(Continued)

(52) U.S. Cl.
CPC ................ *B60K 6/48* (2013.01); *B60K 6/365* (2013.01); *B60K 6/387* (2013.01); *H02K 5/173* (2013.01);
(Continued)

(58) Field of Classification Search
CPC ... B60K 6/48; B60K 2006/4808; H02K 7/003
See application file for complete search history.

(56) References Cited

U.S. PATENT DOCUMENTS 3,861,484 A    1/1975   Joslin
5,433,282 A    7/1995   Moroto et al.
(Continued)

FOREIGN PATENT DOCUMENTS

EP    1296440 A2    3/2003
EP    1317050 A2    6/2003
(Continued)

OTHER PUBLICATIONS

International Search Report and Written Opinion for Application No. PCT/BR2018/050434 dated Apr. 2, 2020 (15 pages).
(Continued)

*Primary Examiner* — Brian L Swenson
(74) *Attorney, Agent, or Firm* — Leason Ellis LLP

(57) ABSTRACT

A power transmission set for tractioned axles of vehicles. The power transmission set includes at least one coupling/uncoupling device, a selector unit, a primary shaft, and a secondary shaft. The shafts are interconnected by the selector unit to select and control a type of motor propulsion applied to a tread axle of a vehicle. The shafts cooperatively with the coupling/uncoupling device are configured to provide a configuration in which only a combustion engine is responsible for propulsion; in which only an electric motor provides propulsion; in which both the combustion engine and the electric motor work together to generate torque; or in which the tread axle is uncoupled from the combustion engine and the electric motor and the combustion engine provides power to the electric motor to generate electricity. A vehicle for the transport of cargo and passengers including the power transmission set.

12 Claims, 7 Drawing Sheets

(51) Int. Cl.
  *B60K 6/387* (2007.10)
  *H02K 5/173* (2006.01)
  *H02K 7/00* (2006.01)
  *H02K 7/116* (2006.01)

(52) U.S. Cl.
  CPC ............ *H02K 7/003* (2013.01); *H02K 7/006* (2013.01); *H02K 7/116* (2013.01); *B60Y 2200/92* (2013.01)

(56) References Cited

U.S. PATENT DOCUMENTS

| | | | |
|---|---|---|---|
| 5,730,675 A | | 3/1998 | Yamaguchi |
| 6,592,484 B1 | | 7/2003 | Tsai et al. |
| 7,497,285 B1 * | | 3/2009 | Radev .................... B60K 6/52 180/65.23 |
| 2001/0022245 A1 * | | 9/2001 | Rogg .................... B60W 10/02 903/910 |
| 2001/0042647 A1 | | 11/2001 | Sakamoto et al. |
| 2002/0179350 A1 * | | 12/2002 | Li ........................... B60K 6/36 903/909 |
| 2007/0093341 A1 * | | 4/2007 | Supina .................... B60K 6/46 475/5 |
| 2007/0265126 A1 * | | 11/2007 | Janson .................. B60K 6/387 475/5 |
| 2012/0073281 A1 | | 3/2012 | Hirose et al. |
| 2014/0274553 A1 * | | 9/2014 | Munsell .................... B60K 6/48 180/65.265 |
| 2015/0224867 A1 * | | 8/2015 | Nett ........................ B60K 6/48 180/65.21 |
| 2016/0176280 A1 * | | 6/2016 | Kaltenbach ............. F16H 3/725 475/5 |

FOREIGN PATENT DOCUMENTS

| | | |
|---|---|---|
| WO | 2014003665 A1 | 1/2014 |
| WO | 2017178596 A1 | 10/2017 |

OTHER PUBLICATIONS

Supplementary European Search Report in EP Application No. 18881745.6-1012/3875296, dated Jul. 11, 2022 (7 pages).

* cited by examiner

POWER TRANSMISSION UNIT FOR SHAFTS AND VEHICLE FOR CARRYING PASSENGERS AND GOODS

FIELD OF THE INVENTION

The present invention refers, in general, to a new power transmission set for axles of cargo and passenger transport vehicles, which incorporates an electric motor to provide an electric or hybrid propulsion.

In particular, the power transmission set for axles, object of the present invention, comprises technical, constructive and functional characteristics designed and developed to enable the selection of different working conditions and, accordingly, provide wheel drive imposed by the electric motor, by the combustion engine, by both, both electrical and combustion or, also, work as an electric generator.

BACKGROUND OF THE INVENTION

According to the state of the art, and as generally known by persons skilled in the art, there are already several models of electric and hybrid vehicles, which comprise a combined power transmission set, which is powered by an electric motor, by the combustion engine and also by activating both engines, thus enabling a vehicle to be obtained with fully electric propulsion, totally combustion, or hybrid in which the two engines work simultaneously.

Although it is a relatively new technology, it is noted that this type of combined power transmission set has been occupying increasing ground on the market, and certainly, as can be seen in the state of the art, in the near future, it will be protagonist for the various advantages it presents when compared to technologies that use only combustion engines, for example, fuel consumption and emission of pollutants into the environment.

In this sense, and according to the state of the art, some types of hybrid systems applied in vehicles are known, for example: (i) the serial hybrid, in which the entire traction of the automobile is always originated by the electric motor, and the combustion engine used only generates electric energy; (ii) the parallel hybrid, where the two engines, both electric and combustion, are used to generate power, but the electric only assists the engine to combustion at times when it requires more torque, considering that in these moments there is an increase in fuel consumption; and (iii) the combined hybrid, where the two engines can pull the vehicle, whatever the combination, its composition is similar to a serial hybrid, but the mechanical connection of the wheels is obtained through the two engines.

Additionally, the technology of vehicles with hybrid motorization systems can be classified into two other categories, rechargeable hybrids formed by vehicles equipped with batteries capable of being charged through connection with conventional electrical power outlets. Despite revealing a relatively low autonomy, along the route the electrical system operates alone, without the need to trigger the propellant to combustion. The other category is extended hybrid vehicles, which is similar to rechargeable, but activates the combustion engine to charge the battery, the operation of the combustion engine occurs on a constant basis to increase the autonomy of the vehicle.

As persons skilled in the art will likely appreciate, one of the main drawbacks of these technologies of electric and hybrid motorization is precisely related to the costs of application and implementation. More particularly, according to the technologies known and available in the state of the art the vehicle with the hybrid system are expensive because they require specific components, such as batteries, electric motors, gearboxes, complex and hard to build and assemble power transmission sets, among other numerous peripheral components responsible for providing the assembly and operation of these vehicles.

Furthermore, it is worth mentioning that in the case of cargo or passenger transport vehicles, the effort required by the engines and traction mechanisms are subjected to even greater strain than those usually observed in passenger and small vehicles. In these cases, it is noted that, while seeking solutions for the applicability of technologies with hybrid engines, the technologies currently available cannot meet the power need for these vehicles and, when possible, technologies become expensive and economically unviable.

Therefore, although the solutions known in the state of the art meet, in some way, some traction requirements, it is observed that the hybrid motorization systems present in the state of the art are formed by relatively complex arrangements and that require additional components and peripherals, substantially increasing the system and making it impractical from the economic point of view.

Thus, considering the above, it is possible to affirm that hybrid motorization systems, applied in cargo or passenger vehicles, need simple and effective solutions, but mainly capable of reducing the costs involved with the manufacture and assembly of vehicles. It is, therefore, these objectives that are intended to be achieved with the development of the present invention.

DESCRIPTION OF INVENTION

In view of the scenario mentioned above, it is one of the objectives of the present invention to provide a power transmission set for axles, which was specially developed and designed to obtain a practical and functional solution to the problems, limitations and drawbacks generated by hybrid motorization systems known in the state of the art, as exemplified above.

More particularly, it is one of the objectives of the present invention to provide a power transmission set to the tractioned axle of a vehicle comprised of technical, constructive and functional characteristics that allow the effective control of working conditions, and can be fully electric, fully combustion, hybrid or, also, act as a mere electric generator. Therefore, it is one of the objectives of the present invention to provide a power transmission set capable of being configured according to the needs and interests of the driver, thus being able to obtain substantial fuel economy and to reduce toxic gas emissions into the environment.

It is also an objective of the present invention to provide a vehicle for the transport of cargo or passengers comprising a power transmission set equipped with a drive system, as specified above.

Thus, in view of the above, in order to achieve the technical and functional objectives and effects indicated above, among others, the present invention refers to a power transmission set comprising a primary axle and a secondary axle interconnected by a selector unit responsible for the selection and control of the type of motor propulsion applied to the vehicle's tread axle, and through the cooperative performance of the coupling/uncoupling devices provided for the connection of a transmission gear, it becomes possible to configure the motor propulsion applied to said tread axle.

According to the present invention, depending on the performance of said coupling/uncoupling devices, the power transmission set can work between a configuration in which only the combustion engine is responsible for propulsion; only the electric motor provides propulsion, in which both motors work together to generate torque; or, further, turn the power transmission set into a kind of electric power generator.

Furthermore, according to an embodiment of the power transmission set for axles, according to the present invention, comprised by the arrangement of the primary and secondary axles interconnected by the selector unit, which is formed by a gearbox and an intermediate connection gear positioned on said primary and secondary axles. Next to said intermediate connection gear there is arranged a transmission gear that is supported freely on the primary axle and is coupled to the outer diameter of the transfer gear positioned on the parallel axle that has a pinion in contact with the crown of the vehicle's tread axle. Additionally, these intermediate and transmission connection gears are interconnected through coupling/uncoupling devices responsible for effectively promoting the definition of the operating mode of the power transmission set, depending on the type of motorization desired.

According to another embodiment of the present invention, the gearbox of the power transmission set selector unit is comprised of a housing that accommodates the planetary gears around a solar gear that is positioned on the end of the secondary axle that is connected to said electric motor.

According to another embodiment of the present invention, said primary axle is supported on bearings with rollers next to the housing of the power transmission set, while the secondary axle is also supported on bearings with rollers, which are mounted on the housing of the power transmission set, on one side near said selector unit, and on the other side near the electric motor mounting flange. Optionally, these primary and secondary axles are supported in lubricated bearings without rollers, and arranged within said housing of the power transmission set.

In addition, according to an embodiment of the power transmission set for axles, object of the present invention, the support bearings of said primary, secondary and parallel axles are provided with unitized rollers to provide technical and functional improvements in the set.

In another embodiment of the present invention, the coupling/uncoupling devices are formed by an actuator comprising an axle endowed with a return medium, such as a spring, and also a fork connected in a glove with teeth on its side face for interconnection with the teeth provided on the sides of said transmission gear. In addition, these gloves are configured with striation in the inner diameter for connection, respectively, with the intermediate connection gear and the striation provided on the primary axle.

Also, according to the present invention, it can be said that according to possible embodiments, said coupling/uncoupling devices may be configured to be activated or disabled. Depending on the configuration, the teeth of the side face of said gloves are in contact with the teeth of the transmission gear. In another configuration, only the teeth of one of the gloves of the coupling/uncoupling devices are in contact with the teeth of the transmission gear. And further according to one more configuration, the teeth of the gloves are uncoupled from said transmission gear. Thus, according to the configuration adopted according to the state of the coupling/uncoupling devices, it is possible to determine the type of motor propulsion that will be applied to the vehicle's tread axle.

According to an embodiment of the present invention, the actuators of the coupling/uncoupling devices are pneumatic and connected to the compressed air system of the vehicle itself. However, alternatively, such actuators can be hydraulic, electrical, electronic or even a combination of these technologies.

Finally, also as mentioned earlier, the present invention refers to a vehicle for transporting loads or persons, which is comprised of a traction set consisting basically of the arrangement of a combustion engine coupled in an gearbox whose output is connected on a cardan axle connected to a power transmission set that is connected to an electric motor, and said power transmission set is configured according to the above characteristics. More particularly, said vehicle for transporting cargo or passengers is a truck, a bus, a van or a conventional passenger vehicle.

SUMMARY DESCRIPTION OF DRAWINGS

The characteristics, advantages and technical effects of the present invention, as indicated above, will be understood more adequately by a person skilled in the art from the following detailed description of exemplary—not restrictive—preferred embodiments provided on a basis of preferential embodiments, and with reference to the accompanying schematic drawings, which:

DESCRIPTION OF EMBODIMENTS OF THE INVENTION

The invention is now described in relation to its particular embodiments with reference to the accompanying drawings of exemplary embodiments. Said drawings are schematic, and their dimensions and/or proportions may not correspond to reality, since their aim is to describe the invention in a didactic way. The reference numbers indicated in the figures are repeated throughout the different views to indicate the same or similar technical characteristics. Moreover, the terms eventually used here as: above, below, upper, lower, side, right, left, frontal, rear and variations thereof should be interpreted according to the guidance given in FIGS. 1 and 2.

Figure 1:
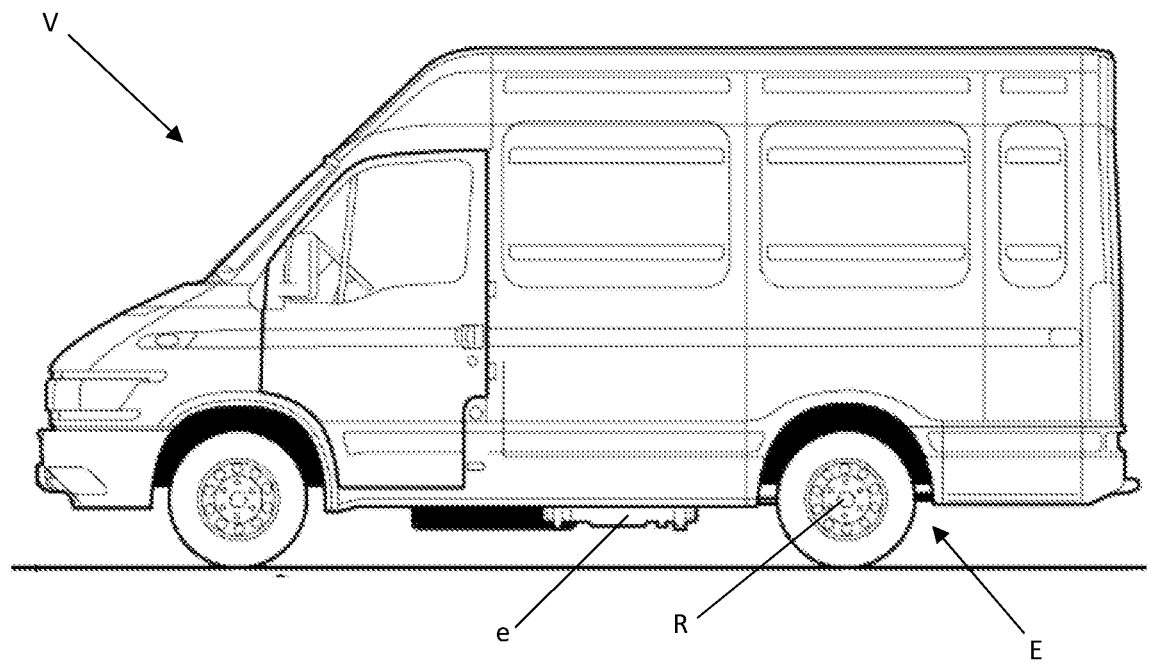
FIG. 1 shows a schematic side view of a vehicle, such as a commercial van.
Figure 2:
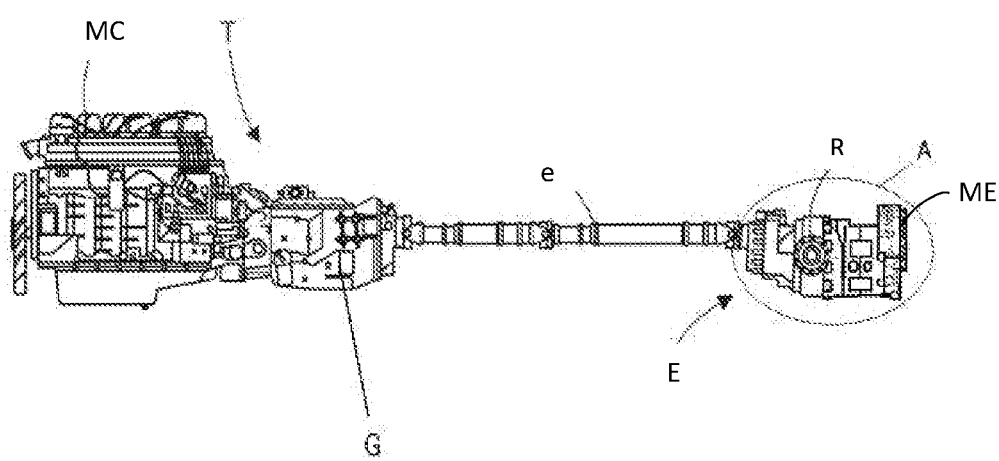
FIG. 2 shows a schematic side view of a traction set, including the motor, gearbox, cardan axle connected to the power transmission set, according to the present invention.

As an illustrative basis and for an improved understanding of the present invention, FIGS. 1 and 2 show, respectively, a cargo transport vehicle (V) and its traction set (T). The vehicle (V) may be a truck, bus, vans, or even conventional vehicles.

Thus, considering the scope of the present invention, it can be said that these vehicle models (V) are constituted by at least one traction set (T) consisting of the combustion engine (MC), to which a gearbox (G) is coupled with output connected on a cardan axle (e) which, in turn, is connected to the power transmission set (E), according to the present invention, the purpose of which is to move the axles (R) of the vehicle (V).

In this context, and according to the present invention, the power transmission set (E) is formed by the primary 10 and secondary 12 axles, which are interconnected by means of a selector unit 11 responsible for the control of the type of motor propulsion of the tread axle (R) of the vehicle (V), and through the cooperative operation of coupling/uncoupling devices 30 and 40, it is possible to select the motor propulsion of the tread axle (R) between a configuration in which only the combustion engine (MC) is responsible for the propulsion; only the electric motor (ME) provides propulsion; in which both motors (MC, ME) work together to supply torque to the tread axle (R), or even promote the uncoupling of the traction of the tread axle (R) so as to feed the electric motor (ME) that becomes an electric power generator.

More particularly, the power transmission set (E), object of the present invention, is formed by the interconnection of said primary 10 and secondary 12 axles through the selector unit 11. This selector unit 11 consists of a 13 gearbox and an intermediate connection gear 14 arranged on said primary 10 and secondary 12 axles. Beside said intermediate connection gear 14 a transmission gear 15 is also provided that is freely supported on said primary axle 10 and is coupled to the outer diameter of the transfer gear 16 arranged on the parallel axle 16a equipped with pinion 16b for transmission of power (torque and rotation) to the crown 17 of the tread axle (R).

It is worth noting that said gearbox 13 is comprised by a housing 13a that accommodates planetary gears 13b around the solar gear 13c which is positioned on the end of said secondary axle 12 that is connected to the electric motor (ME). Thus, it becomes possible to equalize the speed of rotation of the electric motor (ME) with the speed of rotation of the combustion engine (MC) to enable the simultaneous and balanced actuation of the two engines on the tread axle (R).

In addition, as persons skilled in the art will likely appreciate, said primary axle 10 is supported on the housing of the power transmission set through, for example, bearings with rollers 10a and, said secondary axle 12 is supported, for example, by bearings with rollers 12a mounted on the housing of the transmission set, on one side close to the selector unit 11, and on the other side, next to the mounting flange 18 of said electric motor (ME). Alternatively, said primary 10 and secondary 12 axles may simply be supported on lubricated bearings, i.e. without rollers per se, or with any other known and equivalent technology for bearing the axles inside the housing of the transmission set. Similarly, said parallel axle 16a is mounted on the housing of the transmission set in bearings with 16a' bearings or, optionally, on lubricated bearings without rollers.

According to an embodiment of the present invention, these support bearings of the primary 10, secondary 12 and parallel 16a axles are provided with unitized rollers to provide greater durability, stability and precision in the rotational movement of these axles.

According to the present invention, and in order to obtain the proper connections between said primary 10, secondary 20 and parallel 16a axles, the power transmission set (E) also comprises coupling/uncoupling devices 30 and 40, which are responsible for promoting the respective gear interconnections described above so as to select and control the type of propulsion and the mode of operation of the electric motor (ME) and combustion engine (MC).

Figure 3A:
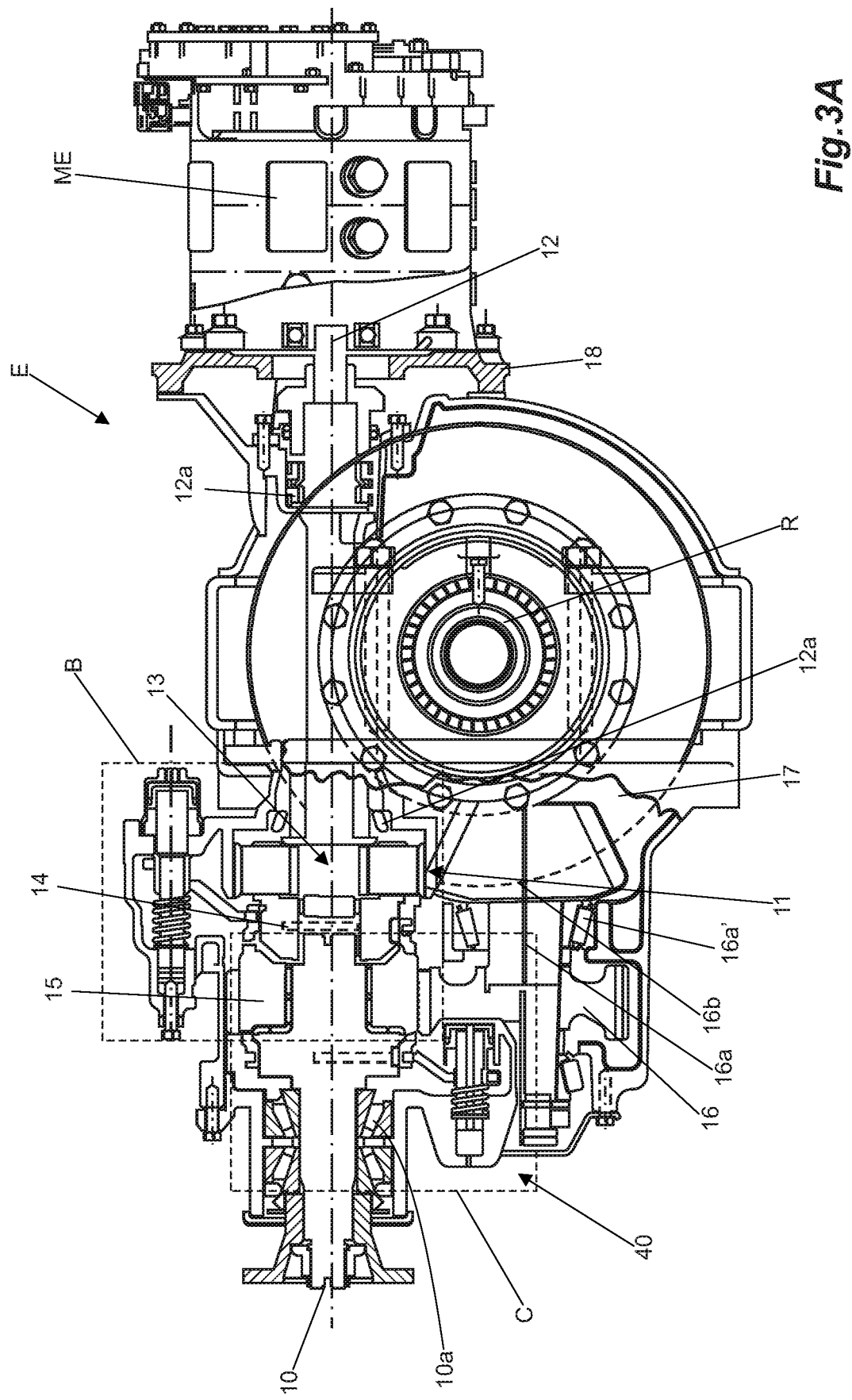
FIG. 3A shows a side cutaway view of the power transmission set, object of the present invention, and as indicated by the detail "A" indicated in FIG. 2.
Figure 3B:
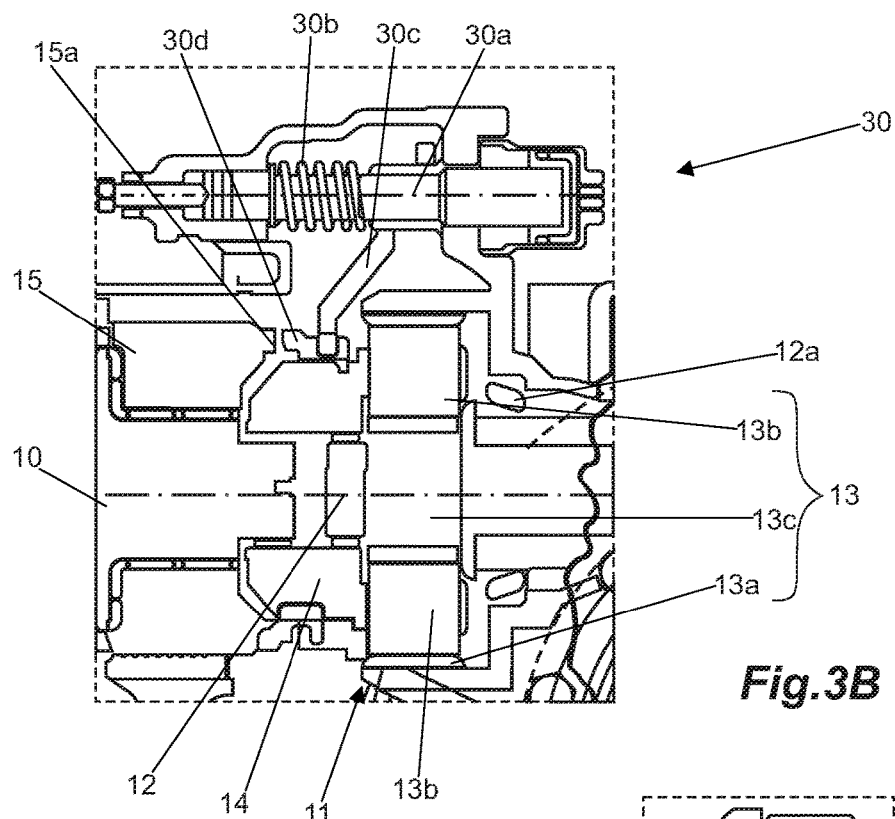
FIGS. 3B and 3C show expanded views of coupling/uncoupling devices for the activation of the power transmission set, according to the present invention, and as indicated by the details "B" and "C" represented in FIG. 3A.

As can be seen in the accompanying drawings, especially FIG. 3B, said coupling/uncoupling device 30 is comprised by an actuator 30a, such as, for example, a pneumatic valve that can even take advantage of the compressed air line of the vehicle (V) itself, which has an axle endowed with return medium 30b and also a fork 30c that connects in a glove 30d, equipped with striation in the inner diameter for connection with the intermediate connection gear 14, and teeth on its side face to facilitate interconnection with the transmission gear 15.

Figure 3C:
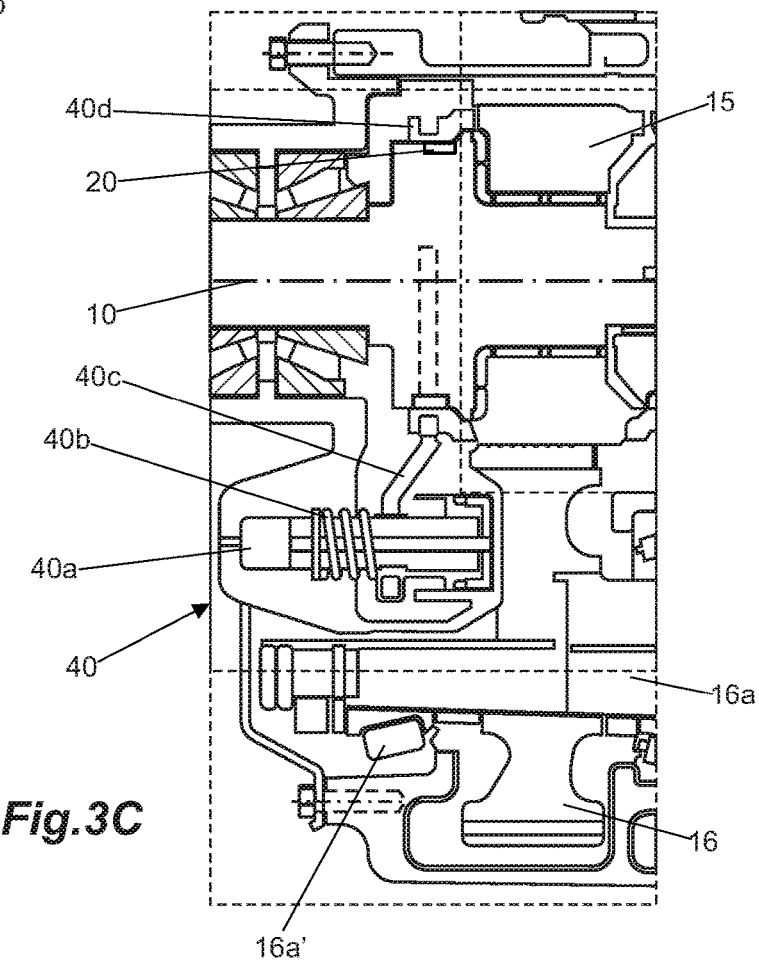

Particularly with reference to FIG. 3C, the coupling/uncoupling device 40 in a manner analogous to the device 30, is comprised of an actuator 40a, which can also be, for example, a pneumatic valve to take advantage of the compressed air line of the vehicle (V) itself. It also has an axle equipped with a return medium 40b and a fork 40c whose end is provided with a connector glove 40d, equipped with striation in the internal diameter for connection with the striation 20 provided in said primary axle 10, in addition to teeth on one of its side faces to promote interconnection with said transmission gear 15.

In this sense, it is worth mentioning that the transmission gear 15 comprises an adequate machining with teeth 15a on its side walls for connection with each of said gloves 30d, 40d, respectively of the coupling/uncoupling devices 30 and 40.

As will likely be appreciated by persons skilled in the art, said actuators 30a and 40a are preferably pneumatic valves, but nothing prevents other means or drive mechanisms from being applied also in the present invention, for example, electric actuators, mechanical actuators or a combination of technologies capable of providing the longitudinal movement of said forks 30c and 40c, and consequently of said gloves 30d and 40d.

Reference is now made to FIGS. 4, 5, 6 and 7, which illustrate embodiments of the power transmission set, object of the present invention, under different working conditions and, more particularly, in different situations of performance of the respective coupling/uncoupling devices 30 and 40.

Figure 4:
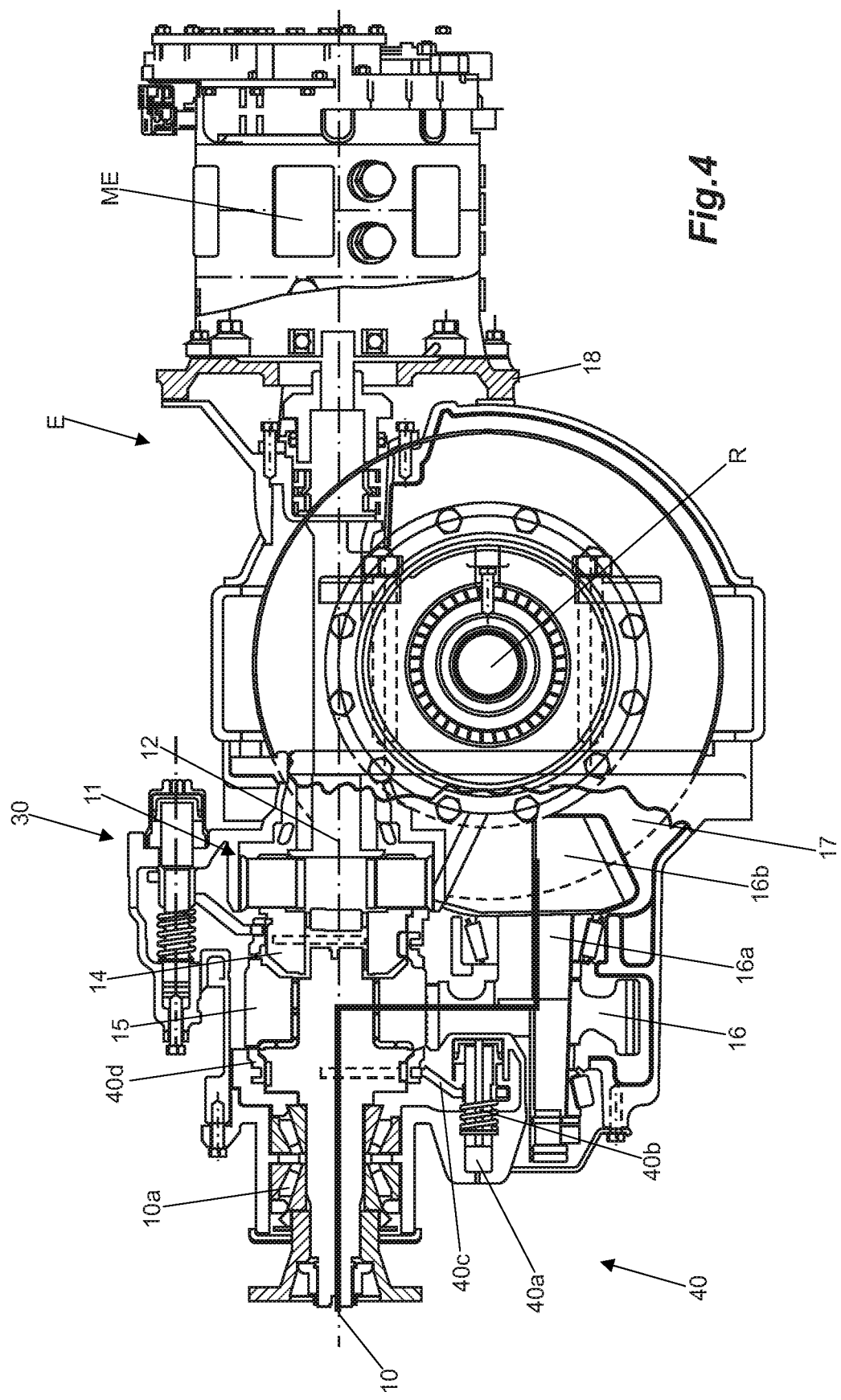
FIGS. 4, 5, 6 and 7 show views similar to FIG. 3A, but under different working conditions of the power transmission set, according to the present invention.

First in relation to FIG. 4, the power transmission set for axles is in the working condition in which said coupling/uncoupling device 40 is properly coupled and the coupling/uncoupling device 30 is uncoupled. In this situation, in which the return element 40b is in the natural state (in the case of the use of spring, position in which it is not compressed), and said glove 40d is coupled, respectively, to the transmission gear 15 and there is no connection to the secondary axle 12 and, for this reason, the transmission gear 15 and transfer gear 16 transfer the power supplied by the combustion engine (MC) only between the primary axle 10 to the parallel axle 16a comprising said pinion 16b responsible for transmitting the power to the crown 17 of the tread axle (R). That is, in this condition, 100% of the power comes from the combustion engine (MC).

Figure 5:
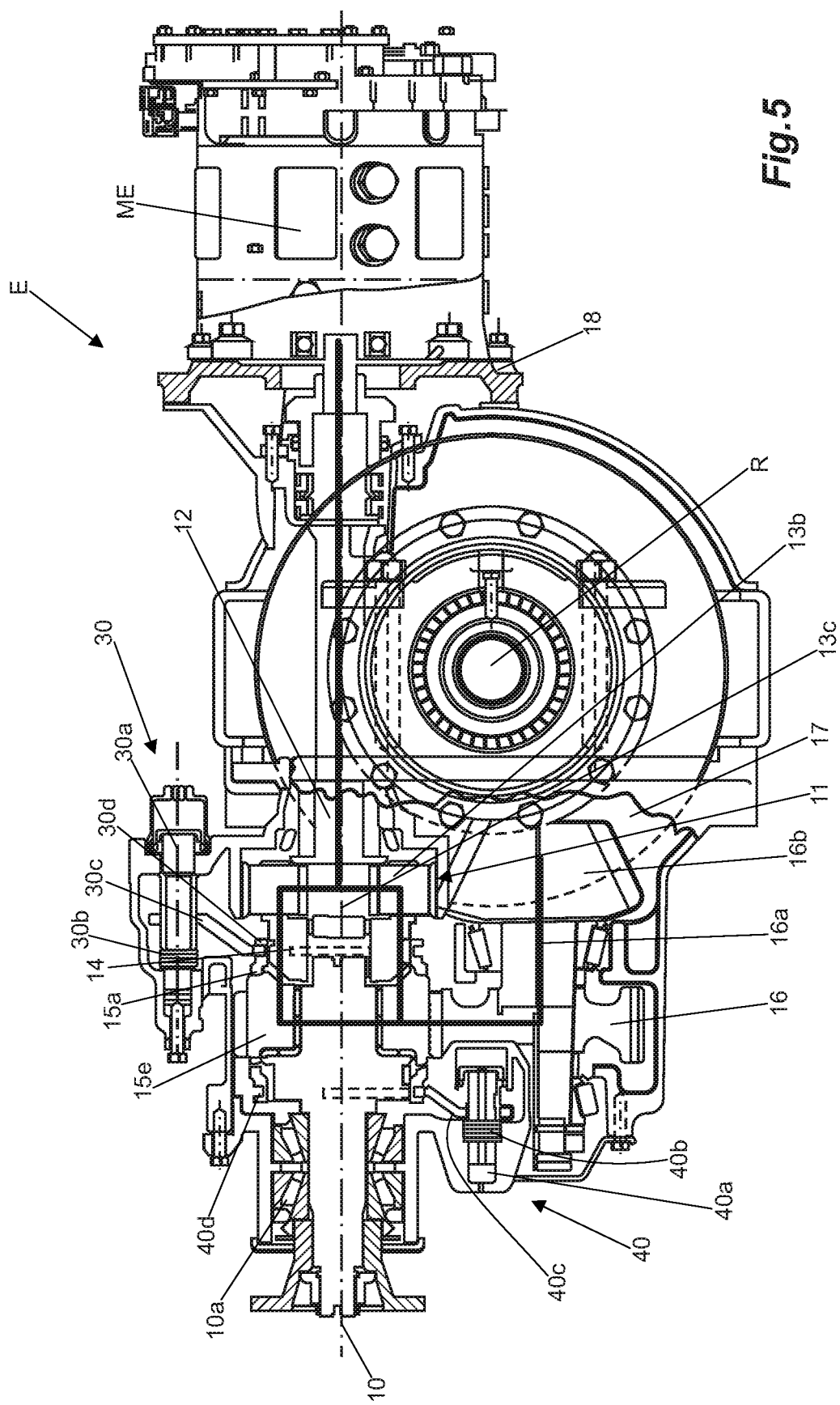

Just to clarify more objectively, in the operating state of the power transmission set represented by FIG. 4, it is possible to observe that the power transmission set (E), object of the present invention, presents the following operation:

the power is transmitted by the primary axle 10 promoting rotational drive of the glove 40d, rotating the transmission gear 15;

transmission gear 15 transfers power to transfer gear 16 and consequently promoting rotation of the parallel axle 16a so that:

on the parallel axle 16a that accommodates the pinion 16b, which in turn transfers the power to the crown 17 which moves the tread axle (R);

FIG. 5 shows the power transmission set for axles in the working condition where said coupling/uncoupling device 30 is coupled and the coupling and uncoupling device 40 is uncoupled. In this condition, where the return element 30b and 40b, are compressed (in the case of the use of springs), and said glove 30d is coupled, respectively, in the transmission gear 15 and there is no connection with the primary axle 10 and, for this reason, the transmission 15 and transfer 16 gear, transfer the power only between the secondary axle 12 to the parallel axle 16a comprising the pinion 16b responsible for the transmission of the power to the crown 17 of the tread axle (R). That is, in this condition, 100% of the power comes from the electric motor (M E).

Just to clarify more objectively, in the state of operation of the power transmission set represented by FIG. 5, it is possible to observe that the transmission set (E), object of the present invention, presents the following operation the power is transmitted by the secondary axle 12 promoting the rotational movement of the solar gear 13c, rotating the planetary gears 13b, the planetary gears 13b transfer power to intermediate connection gear 14 and, consequently, rotating the glove 30d, which in turn transfers power to transmission gear 15 to, respectively, move the transfers gear 16 so that:

on the intermediate connection gear 14 there is mounted said glove 30d whose teeth of one of its side faces are engaged in the teeth 15a of the transmission gear 15, which moves the transfer gear 16, to rotate the parallel axle 16a that accommodates the pinion 16b, which, in turn, transfers the power to the crown 17 of the tread axle (R).

Figure 6:
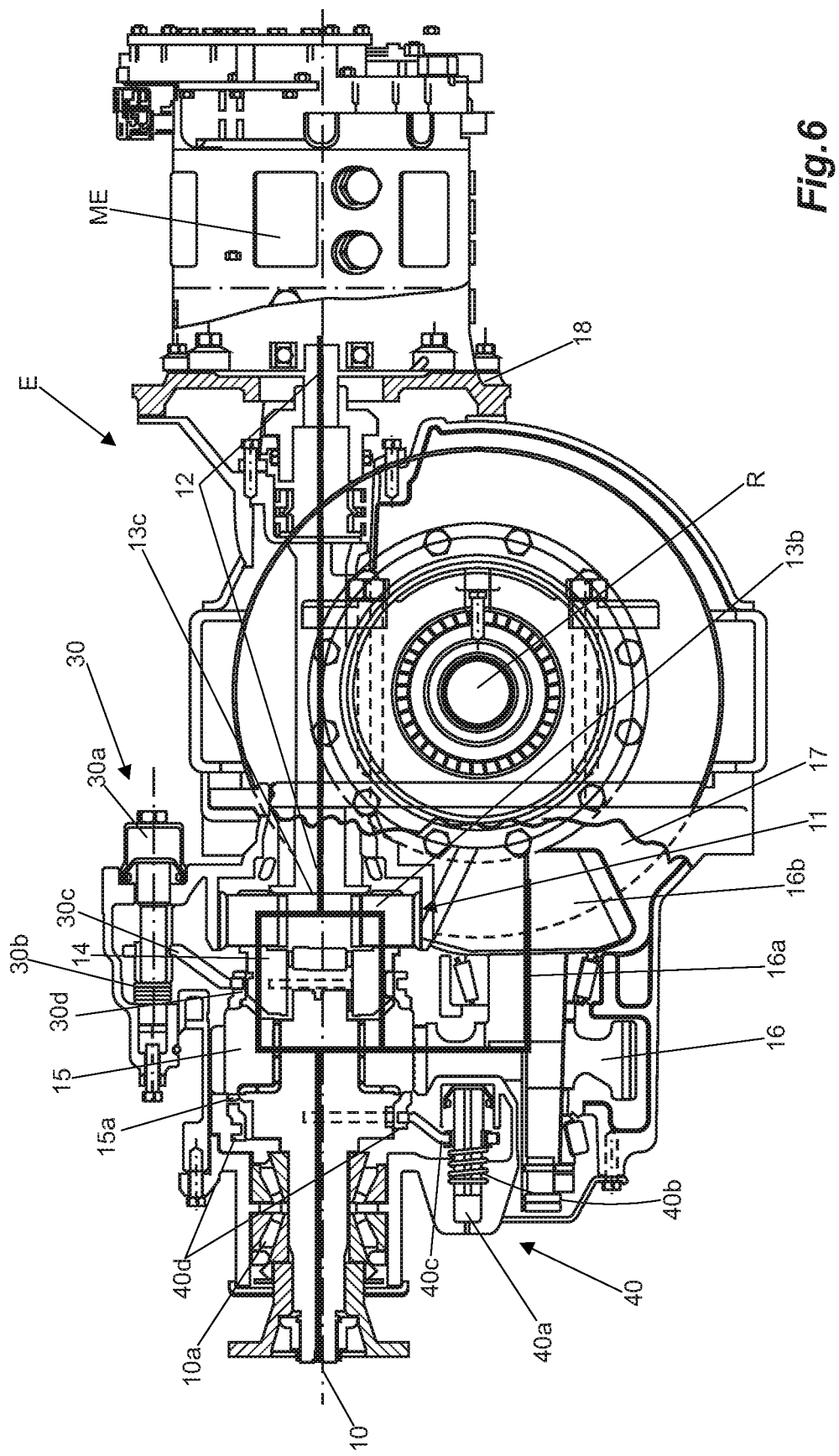

FIG. 6 schematically shows the power transmission set (E) in the state in which coupling/uncoupling devices 30 and 40 are coupled, enabling the power transmission to come from both electric (ME) and combustion (MC) engines.

As can be seen, the 30a actuator of the coupling/uncoupling device 30 is triggered, causing the return element 30b to be compressed (in this case, a spring), and said fork 30c to be moved to promote the displacement of the glove 30d over the striation of the intermediate connection gear 14, the teeth of one of its side faces connected with the transmission gear 15 teeth 15a.

On the other side of the housing of the power transmission set (E), the coupling/uncoupling device 40 is disabled, causing the return element 40b to be in the natural state (in the case of a spring, the state that is not compressed). In this condition, as should be observed, the traction of both axles, primary 10 and secondary 12, is used to move the transmission gear 15 that moves the transfer gear 16, transmitting all the power coming from the two engines, electric (ME) and combustion (MC) to the parallel axle 16a with pinion 16b responsible for transmitting the power to the crown 17 of the tread axle (R).

In this configuration represented by FIG. 6, the electric motor (ME) can be used to supplement the torque from the combustion engine (MC), or vice versa.

Thus, and for example, it is possible to verify that the power transmission set (E), according to the present invention, presents the following operation in the condition represented by FIG. 6:

power entering by primary axle 10 promotes the rotational movement of the glove 40d of the coupling/uncoupling device 40;

at the same time, the power that comes from the secondary axle 12, rotates the solar gear 13c, so that:

the solar gear 13c rotates the planetary gears 13b which, in turn, transfer power to intermediate connection gear 14, therefore, rotating the glove 30d of the coupling/uncoupling device 30;

the gloves 30d and 40d transfer the power for the transmission gear 15, so that;

the transmission gear 15 is rotated jointly with the primary axle 10 and, once the glove 30d and 40d are coupled to the transmission gear 15, the force transfer to the parallel axle 16a of the pinion 16b occurs, by means of the transfer gear 16 and, consequently, the movement of the crown 17 of the first tread axle (R) occurs;

In this condition, in which the coupling/uncoupling device 30 is activated, and both engines are working simultaneously, the electric motor (ME) can supplement the torque coming from the combustion engine (MC) at times when more force and torque is needed on the tread axle (R), because the combustion engine (MC) ends up consuming more fuel at times when it requires more power.

Figure 7:
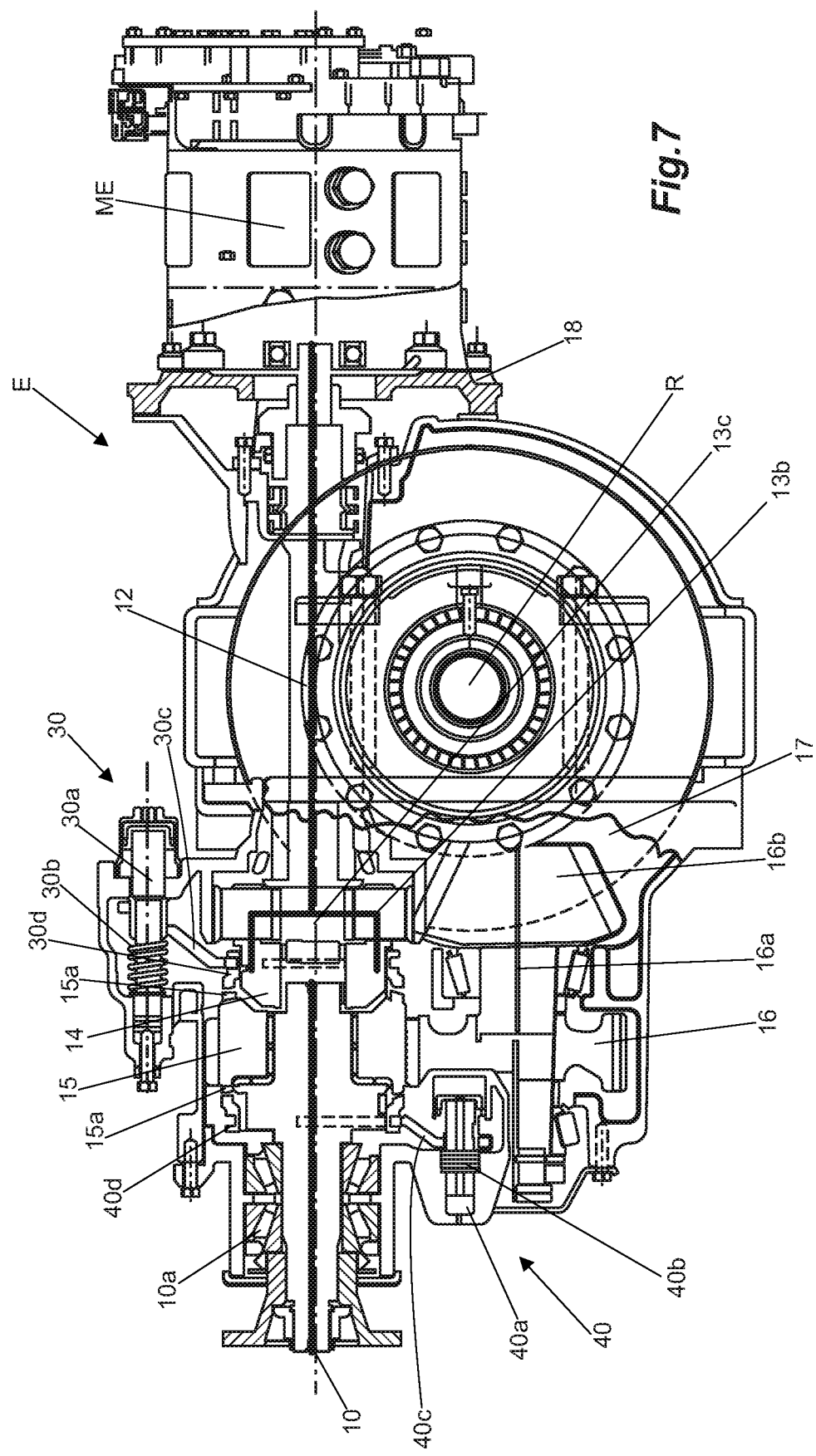

FIG. 7 schematically shows the power transmission set (E) in exactly the opposite condition of that represented by FIG. 6, that is, both engines are not tractioning the 16a parallel axle. However, the torque from the combustion engine (MC) is used to power the electric motor (ME) in order to generate electricity. In this situation, the coupling/uncoupling device 30 is disabled and the coupling/uncoupling device 40 is activated. As can be seen, the 40a actuator of the coupling/uncoupling device 40 is triggered, causing the return element 40b to be compressed (in this case, a spring), and the fork 40c to be moved to promote the displacement of the glove 40d, disconnecting the teeth from its side face of the side teeth 15a of the transmission gear 15.

The actuator 30a of the coupling/uncoupling device 30 is in the uncoupled state, causing the return element 30b to be in its natural state (in this case, a spring, when it is not in compressed state), and the fork 30c is moved to promote displacement of the glove 30d over the striation of the gear of the intermediate connection 14, disconnecting the teeth from its side face of the transmission gear 15 teeth 15a.

In this condition, as should be observed, traction on the parallel axle 16a is totally disabled, consequently, by moving the intermediate connection gear 14, the transfer of the power from the engine to combustion (MC) occurs to the selector unit 11, which promotes the respective speed equalization through the gearbox 13, to provide adequate movement of the secondary axle 12 and, finally, for the electric motor (ME).

Thus, it is possible to observe that the power transmission set (E), in the condition represented by FIG. 7, presents the following operation:

the power is transmitted to the primary axle 10 which promotes the rotational movement of the intermediate connection gear 14;

the intermediate connection gear 14 transfers the power to planetary gears 13b, such that:

between planetary gears 13b there is arranged the solar gear 13c in which said secondary axle 12 is fixed so as to allow the power to be transferred to the electric motor (ME), with the purpose of generating electric power. In other words, as persons skilled in the art will likely note, this working configuration is able to transform the power transmission set (E) into a kind of power generator.

Additionally, as commented above, the present invention also refers to a vehicle for the transport of cargo or passengers (V), which comprises a mechanical traction set (T) consisting of a combustion engine (MC), in which a gearbox (G) is coupled with output connected to a cardan axle (e)

that, in turn, is connected in a power transmission set for axles (E), which is formed by the arrangement of a primary axle 10 and a secondary axle 12 interconnected by a selector unit 11, which, in cooperation with coupling/uncoupling devices 30 and 40, can select the motor propulsion of the tread axle (R) between a fully combustion configuration, fully electric, hybrid in which both motors (MC, ME) work together to supply torque to the tread axle (R), or even as an electric power generator.

More particularly, the vehicle for the transport of cargo or passengers (V) is a truck, bus, van or even conventional vehicles.

In view of all the above, it is clear that through the power transmission set for axles particularly intended for hybrid systems, object of the present invention, the driver driving the vehicle (V) manages to promote a rotation of the engines during displacements, that is, the driver or, potentially, an automated system can define the motor propulsion between only the combustion engine (MC), only the electric motor (ME) or even both working together to generate torque, and finally, enabling the torque from the combustion engine (MC) to be applied in the power generation next to the electric motor (ME). With this, as likely appreciated by persons skilled in the art, the present invention is able to provide significant economic advantages for autonomous drivers and transport companies, and ecological for the environment, substantially reducing fuel consumption and emission of polluting gases.

Finally, in view of all the above, it is important to be clear that the aim of this description is only to present and define exemplary embodiments of the power transmission set for axles applied hybrid vehicles for the transport of cargo, or passengers, or other types of vehicles. Therefore, as the persons skilled in the art will most likely understand, several modifications and constructive combinations of equivalent elements are possible without straying from the scope of protection defined by the accompanying claims.

The invention claimed is:

1. A power transmission set for shafts comprising: at least one coupling/uncoupling device; a selector unit; and a primary shaft and a secondary shaft interconnected by the selector unit to select and control a type of motor propulsion applied to a tread axle of a vehicle, wherein the primary and secondary shafts cooperatively with the at least one coupling/uncoupling device are configured to provide: a configuration in which only a combustion engine provides propulsion to the tread axle; a configuration in which only an electric motor provides propulsion to the tread axle; a configuration in which both the combustion engine and the electric motor together provide propulsion to the tread axle; and a configuration in which the tread axle is uncoupled from the combustion engine and the electric motor and in which the combustion engine provides power to the electric motor to generate electricity;

wherein: the primary shaft and the secondary shaft are interconnected through the selector unit, the selector unit comprises: a gearbox; an intermediate connection gear arranged on the primary and secondary shafts; a parallel shaft comprising a pinion in contact with a crown of the tread axle; a transfer gear arranged on the parallel shaft; and a transmission gear that is supported freely on the primary shaft and is coupled to an external diameter of the transfer gear, and the intermediate connection gear and transmission gear are interconnected through the at least one coupling/uncoupling device.

2. The power transmission set for shafts according to claim 1, wherein the gearbox comprises a housing that accommodates planetary gears around a solar gear which is positioned on an end of the secondary shaft, which connected to the electric motor.

3. The power transmission set for shafts according to claim 1, wherein the at least one coupling/uncoupling device comprises an actuator that has a shaft provided with a return and a fork, the fork connecting in a glove having: teeth on a side face for interconnection with teeth provided on sides of the transmission gear; and striations in an inner diameter for connection with the intermediate connection gear and striations provided on the primary axle.

4. The power transmission set for shafts according to claim 3, wherein, in an activated state of the at least one coupling/uncoupling device, only the teeth of the side face of the glove are in contact with the teeth of the transmission gear.

5. The power transmission set for shafts according to claim 3, wherein, in a disabled state of the at least one coupling/uncoupling device, only the teeth of the side face of the glove are in contact with the teeth of the transmission gear.

6. The power transmission set for shafts according to claim 3, wherein, in a state in which the at least one coupling/uncoupling device is disabled and the at least one coupling/uncoupling device is activated, the teeth of the side face of the glove are in contact with the teeth of the transmission gear.

7. The power transmission set for shafts according to claim 3, wherein, in a state in which the at least one coupling/uncoupling device is disabled and the at least one coupling/uncoupling device is activated, the teeth of the side face of the glove are not in contact with the teeth of the transmission gear.

8. The power transmission set for shafts according to claim 3, wherein the actuator of the at least one coupling/uncoupling device is pneumatic, hydraulic, electrical, electronic, or a combination of these technologies.

9. The power transmission set for shafts according to claim 3, wherein the actuator of the at least one coupling/uncoupling device is pneumatic and connected to a compressed air system of the vehicle.

10. The power transmission set for shafts according to claim 1, further comprising a housing, wherein the primary shaft is supported on bearings with rollers next to the housing, and the secondary shaft is supported on bearings with rollers mounted on the housing.

11. The power transmission set for shafts according to claim 10, wherein the bearings are unitized bearings.

12. The power transmission set for shafts according to claim 1, further comprising a housing, wherein the primary and secondary shafts are supported on lubricated bearings.

* * * * *